May 8, 1945.  S. BRAND ET AL  2,375,275
RECORD CONTROLLED ACCOUNTING MACHINE
Filed March 3, 1942   10 Sheets-Sheet 4
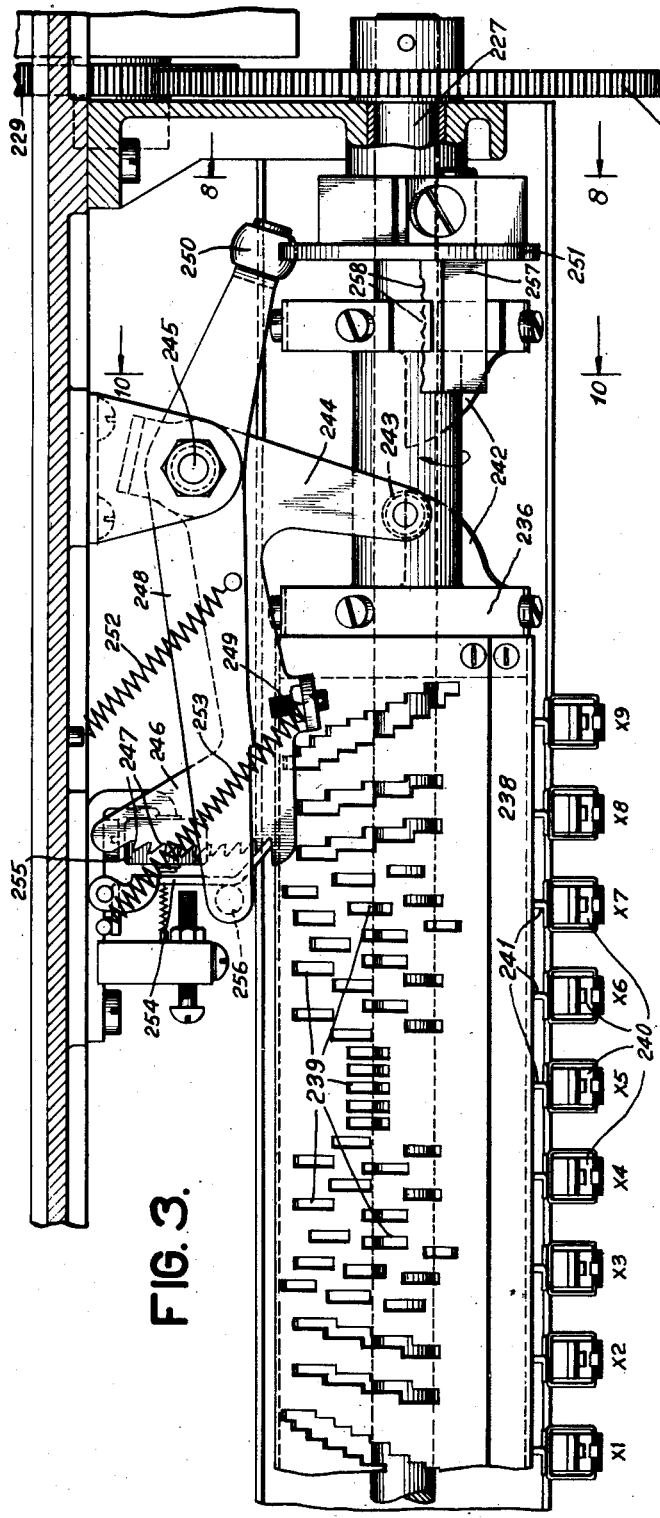
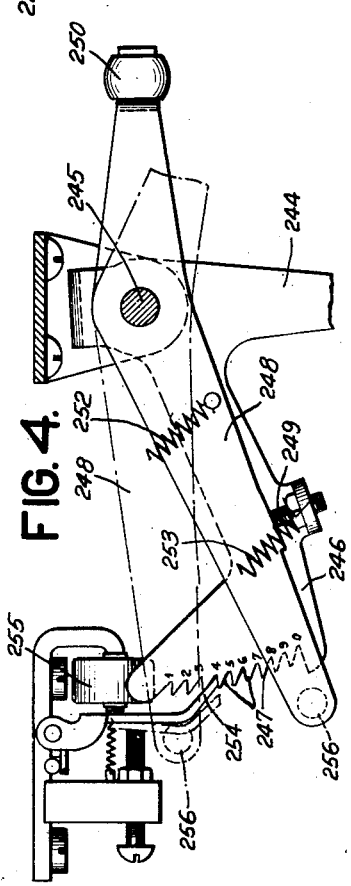

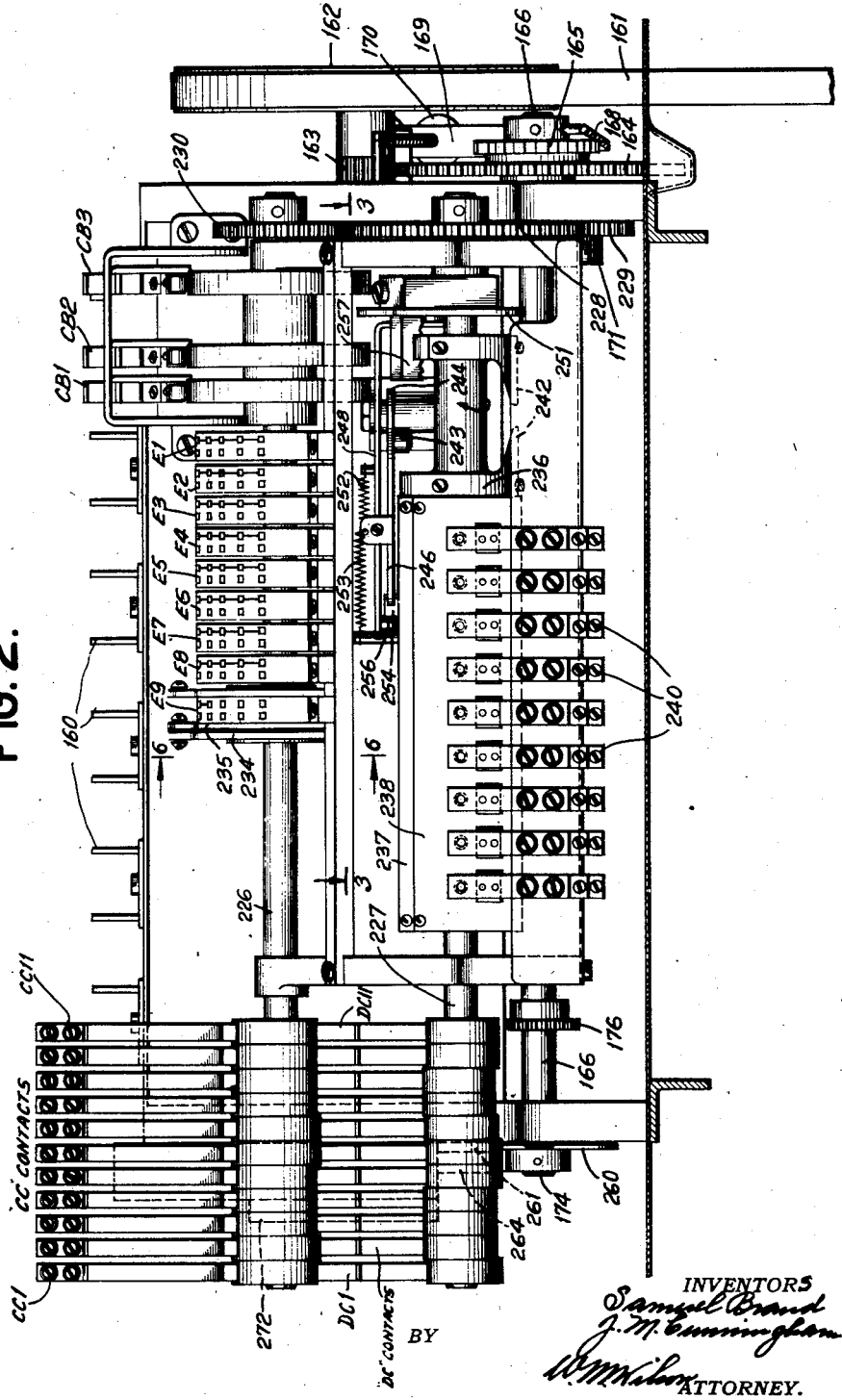

May 8, 1945.   S. BRAND ET AL   2,375,275
RECORD CONTROLLED ACCOUNTING MACHINE
Filed March 3, 1942   10 Sheets-Sheet 5

INVENTORS
Samuel Brand
J. M. Cunningham
BY
ATTORNEY.

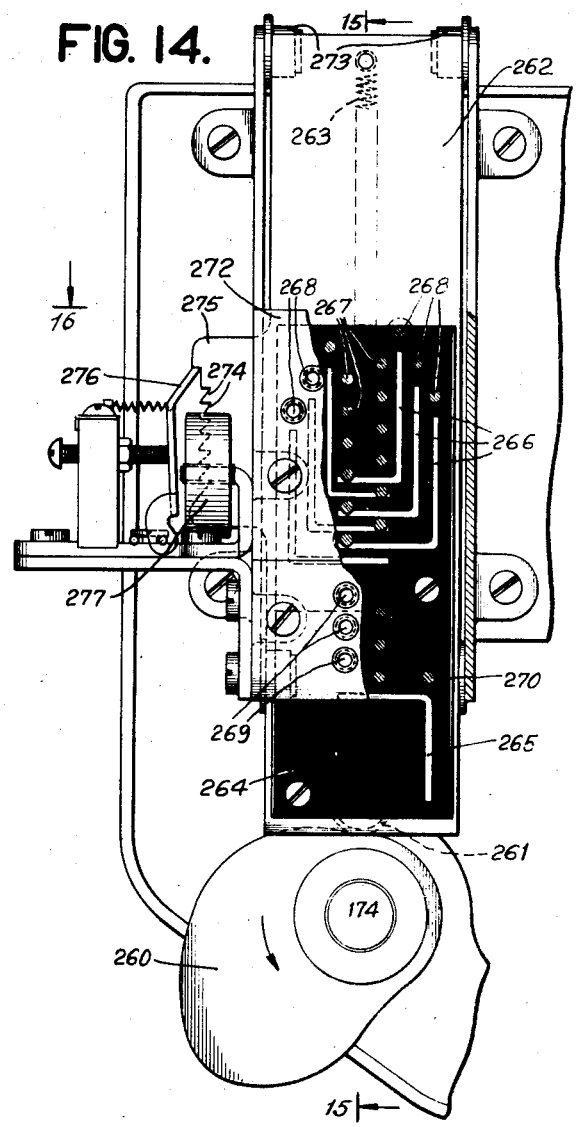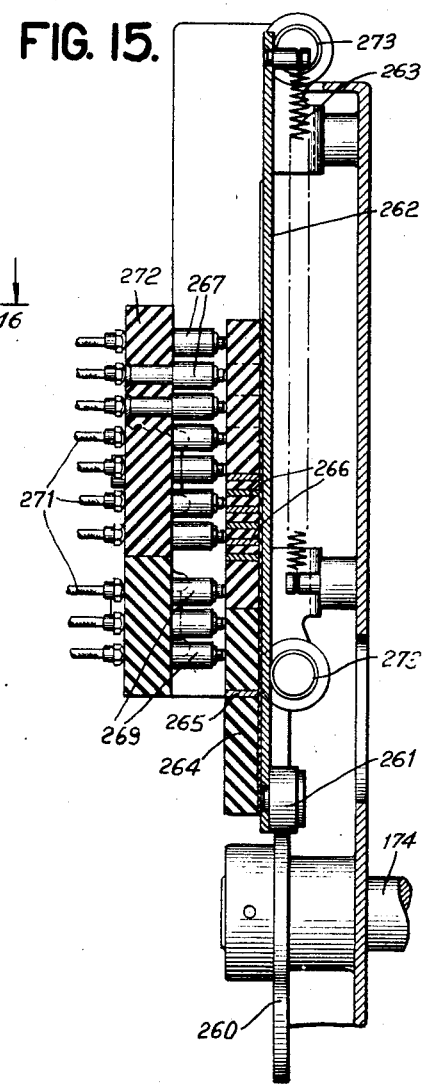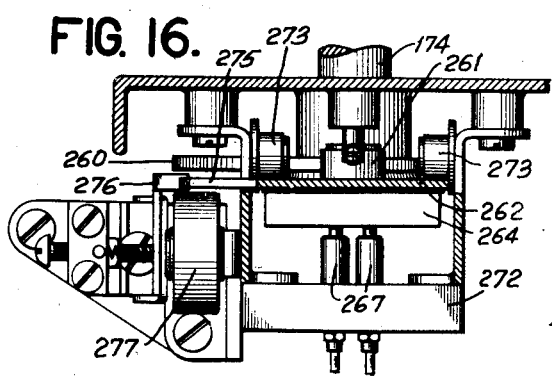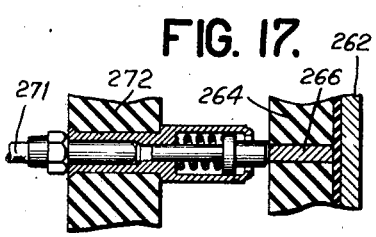

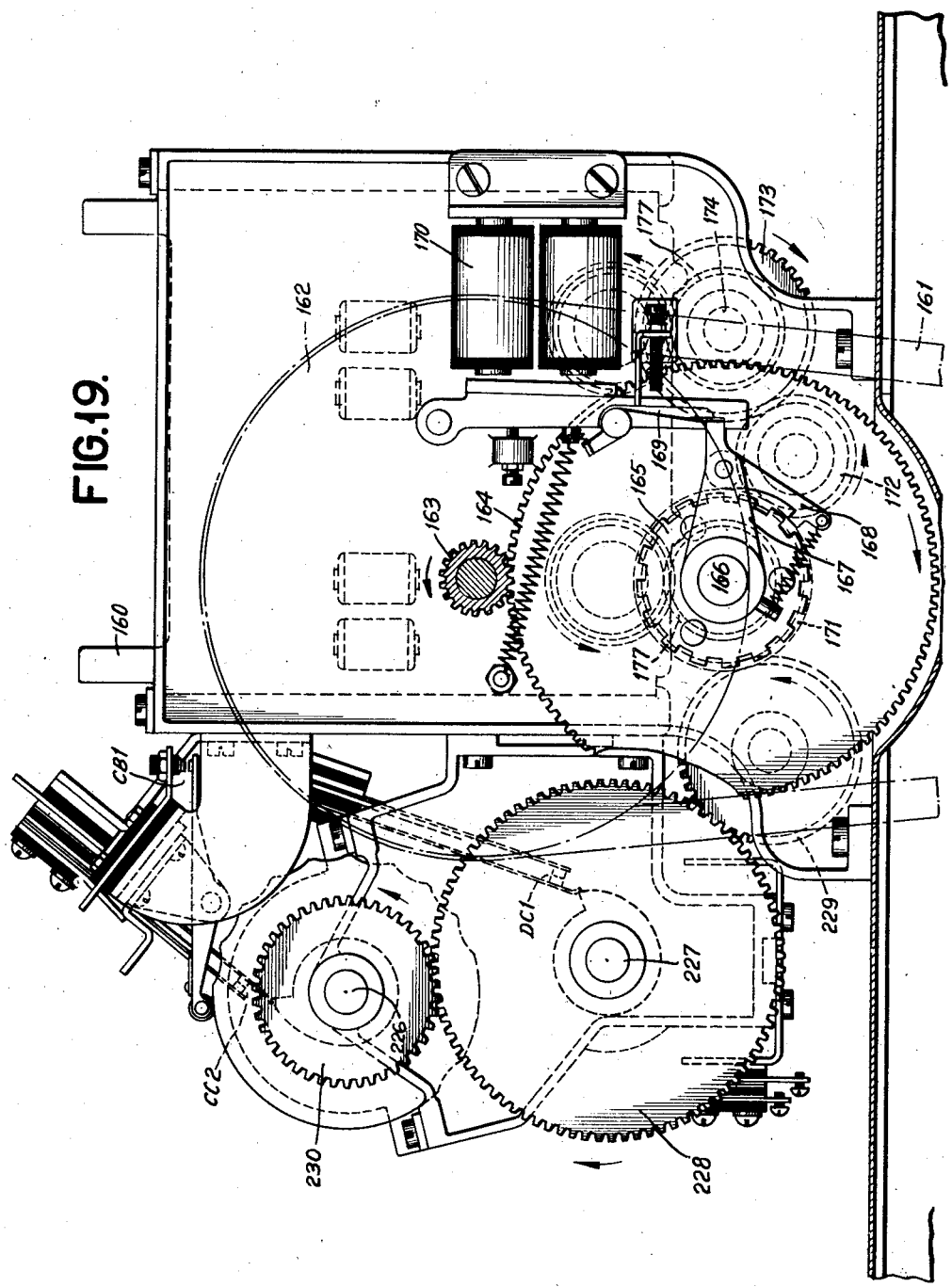

Patented May 8, 1945

2,375,275

UNITED STATES PATENT OFFICE 2,375,275

RECORD CONTROLLED ACCOUNTING MACHINE

Samuel Brand, Binghamton, and James M. Cunningham, Endicott, N. Y., assignors to International Business Machines Corporation, New York, N. Y., a corporation of New York Application March 3, 1942, Serial No. 433,178

6 Claims. (Cl. 235—61)

This invention relates to calculating machines and more particularly to machines in which multiplying operations are performed.

The object of the invention is to provide improved mechanism for carrying out multiplication. The machine is provided with devices for creating the so-called "partial products," and it is a specific object of the invention to provide improved mechanism for more expeditiously selecting partial products in succession.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 1a taken together with Fig. 1 placed above Fig. 1a constitute a wiring diagram of the circuit connections of the device.

Fig. 2 is a view showing the general arrangement of the device.

Fig. 3 is a view looking in the direction of lines 3—3 of Fig. 2 showing the partial products drum and the selecting mechanism therefor.

Fig. 4 is a detail of parts shown in Fig. 3 set in a different position.

Fig. 13 is a view of one of the accumulating orders, the view looking from the opposite direction to that from which Fig. 11 is viewed.

Fig. 14 is a view of the column shift mechanism.

Fig. 15 is a central section section through the column shift mechanism and taken along lines 15—15 of Fig. 14.

Fig. 16 is a plan section taken on lines 16—16 of Fig. 14.

Fig. 17 is a detail of one of the contact plugs of Fig. 15.

Fig. 19 is a view of the drive gearing for the device.

*Factory entry receiving devices*

Figure 1:
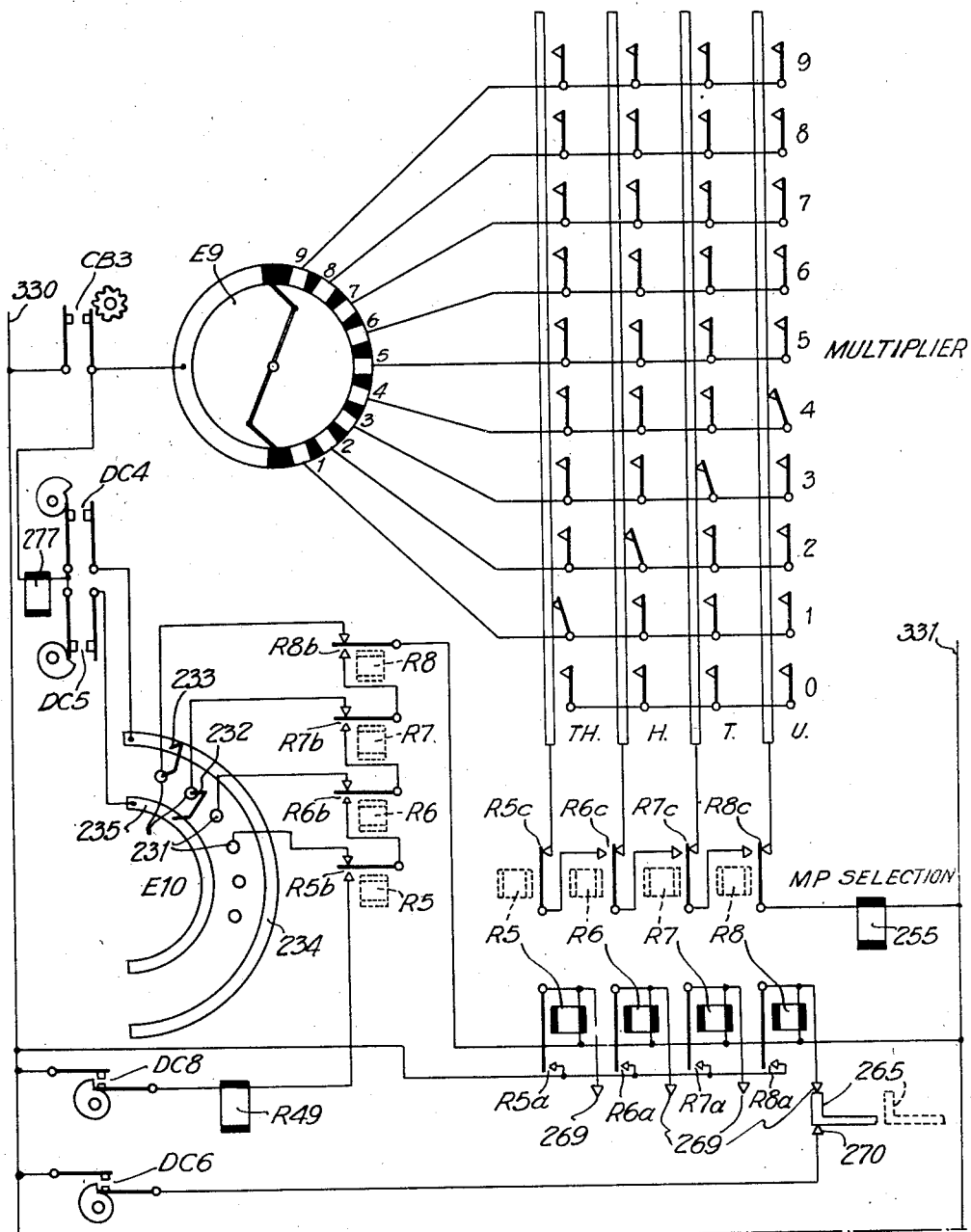

Referring to Fig. 1, there is shown in a diagrammatic manner a device upon which a four place multiplier amount may be set. This device comprises four denominationally ordered contact bars 314, alongside of each of which is a row of contact arms 312 having digital values as indicated. An amount is represented on the device by rocking the digit representing contact arms 312 into engagement with the bars 314 to make contact in columns and rows representative of the amount of the multiplier. Thus, as shown in Fig. 1 the multiplier 1234 is represented by the rocking of the 1, 2, 3, 4 arms 312 in the thousands, hundreds, tens and units orders, respectively, into contacting engagement with their related bars 314. This device is shown diagrammatically inasmuch as the particular mechanism for effecting a setting is not part of the present invention, and it may therefore be assumed that an amount is set up by manually rocking the contact arms in selected positions.

Figure 1A:
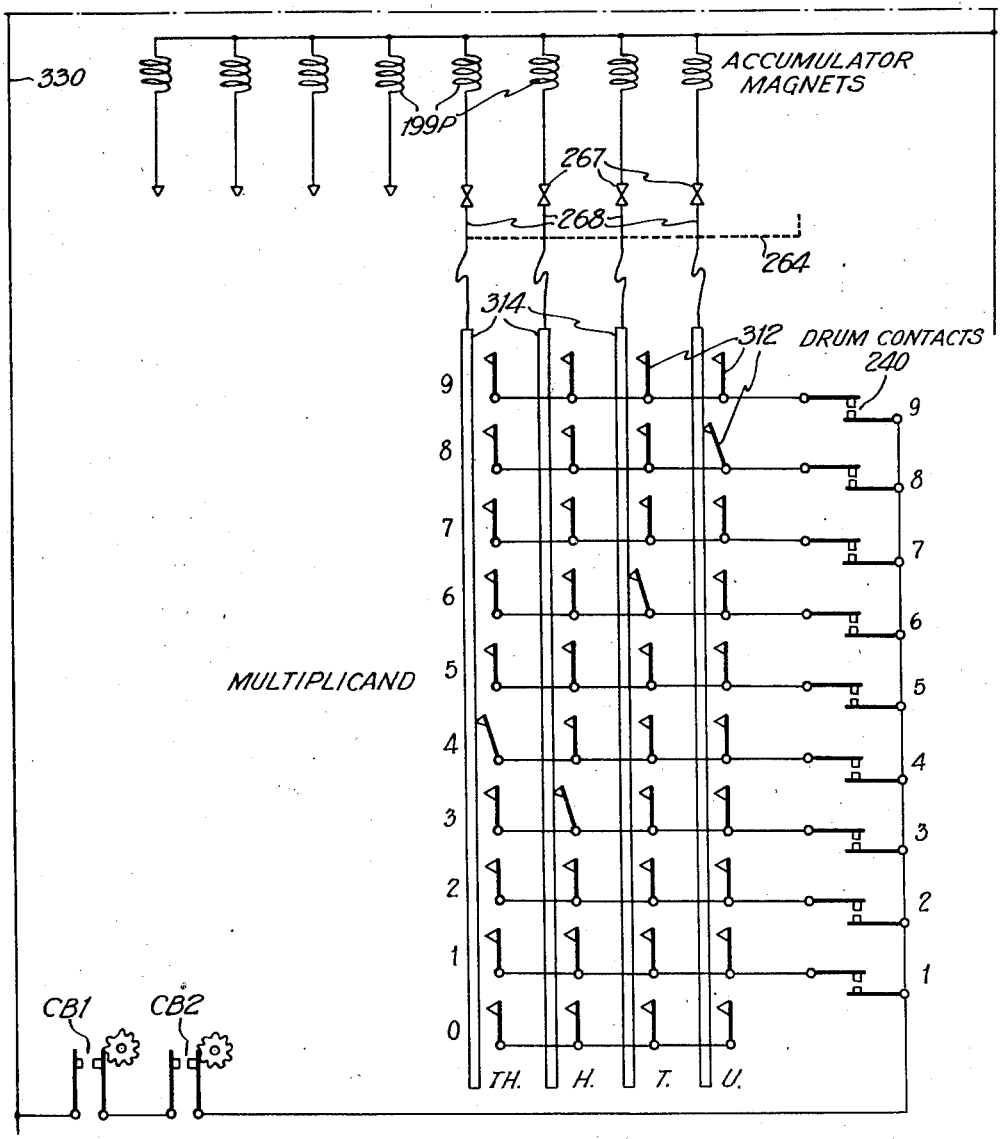

An exactly similar device is provided to receive a multiplicand entry as shown in Fig. 1a where arms 312 are rocked to represent a multiplicand entry of 4368.

*Drive.*—A continuously running motor through belt 161 drives a pulley 162 (Figs. 19 and 2) secured to pinion 163 which meshes with and constantly rotates a gear 164. Secured to gear 164 is a clutch driving member 165 which, with gear 164, is freely mounted on a shaft 166. To the shaft is secured arm 167 which carries spring-pressed dog 168, the arm and dog being normally held as shown in Fig. 19 by latching armature 169 of magnet 170. When magnet 170 is energized, dog 168 is released to effect coupling between shaft 166 and member 165. Shaft 166 has secured thereto a gear 171 which through an idler 172 drives a gear 173 on a shaft 174. The shafts 166 and 174 are the accumulator drive shafts which along their lengths carry gears 177 (Fig. 11) of which there is one for each accumulator order.

Figure 11:
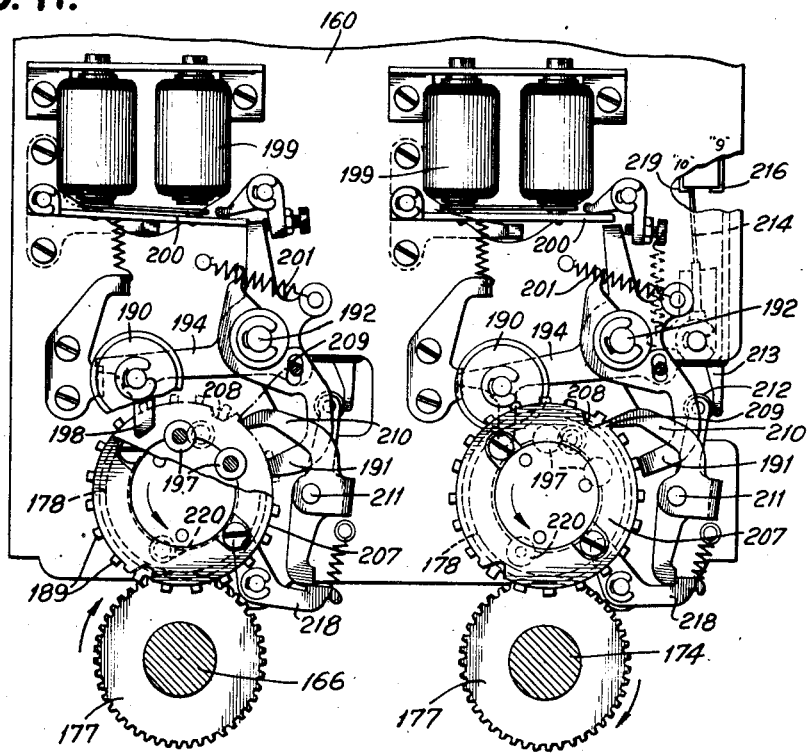
Fig. 11 is a view of one of the double order accumulator plates.

*The accumulating mechanism.*—The accumulating mechanism which will now be briefly described is not novel per se but is the same with the omission of subtracting magnets as described in Patent 2,165,288, granted July 11, 1939, to A. W. Mills. Referring now to Fig. 11, the gear 177 of each order constantly drives a gear 178 (see also Fig. 12) which is freely mounted on a stud 179 secured in plate 160. The plate 160 carries two gears 178 to provide for two denominational orders of an accumulating unit. As shown in Fig. 11, the plate 160 is vertically slidable with its gears 178 away from the gears 177 and in this manner the plate 160 with the mechanism mounted thereon may be removed from the machine for repair or replacement.

Figure 12:
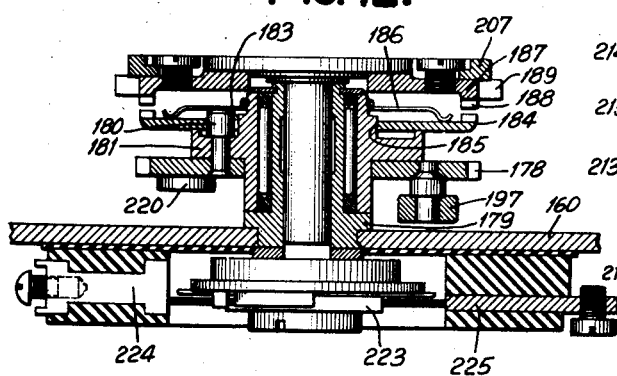
Fig. 12 is a sectional view through one of the accumulating elements, the section being taken along lines 12—12 of Fig. 13.

As viewed in Fig. 12, the gear 178 has secured thereto by means of riveted pin 180 a disk 181. Pin 180 extends into opening 183 in a ratchet 184, which ratchet is freely mounted on the hub 185 of the disk 181 and is normally held against the disk, as shown in Fig. 12 by a leaf spring 186. Adjacent to ratchet 184 is the accumulating wheel 187 which is provided with ratchet teeth 188 and detenting teeth 189. The accumulating wheel 187 is freely rotatable on the stud 179 and is driven by the ratchet 184 when the latter is rocked into engagement with the teeth 188. This rocking is effected by means of a beveled disk 190 in the manner fully explained in the Mills patent referred to.

The accumulating wheel 187 is normally locked by detenting arm 191 whose free end rests between two adjacent teeth 189 and affords a positive restraint against movement of the wheel in either direction. The arm 191 is pivoted on stud 192 and has pin and slot connection with the supporting arm 194 of the beveled disk 190. Upon counterclockwise rocking of the arm 194, the beveled disk 190 will cause engagement of the ratchet 184 with the teeth 188 and at the same time the pin and slot connection 193 will cause withdrawal of the arm 191 from between teeth 189. The proportioning of the parts is such that the engagement of the ratchets is effected before the arm 191 is fully disengaged to insure that the wheel 187 is controlled by either one or the other. The parts will remain in engaged position to drive the accumulating wheel until the arm 194 is again rocked clockwise to its original position. This is effected by a cam roller 197 (Fig. 11) which is carried by the driving gear 178. The roller 197 engages an extension 198 of the arm 194 and causes positive rocking of the latter. During such rocking, the arm 191 is brought into engagement with the teeth 189 preventing further rotation thereof.

The initial rocking of the arm 194 is controlled by a pair of magnets 199 which, upon energization, attracts its armature 200 to release a lateral extension of arm 194, whereupon spring 201 will rock the arm 194 in a counterclockwise direction. It will thus be seen that the accumulating wheel 187 may be clutched to the driving ratchet 184 when the magnet 199 is energized, and declutching will take place when roller 197 strikes extension 198.

The wheel 187 carries a disk 207 which controls the positioning of the usual tens carry contact mechanism. The disk 207 is provided with a notch 208 and a high portion 209 which cooperate with a finger 210 which is pivoted at 211. The arrangement is such that, when the accumulating wheel registers "9," finger 210 will be in engagement with the notch 208 and through the insulating roller 212 the lever 213 carrying brush 214 will be permitted to rock under control of its spring 215, so that the brush 214 makes contact with a contact member 216. When the wheel passes from "9" to "0," the finger 210 will be engaged by extension 209 and rocked clockwise to a position in which it is held by a spring-pressed latch 218 (Fig. 11). In this position the roller 212 will have rocked the arm 213 so that brush 214 makes contact with the contact member 219. This position of the brush 214 is maintained until the roller 220 carried by the gear 178 causes unlatching.

A brief explanation will now be given to indicate the manner in which the parts are timed in relation to the rest of the machine. Referring to the timing chart (Fig. 18), two accumulating cycles are shown with the timing of the accumulator cams indicated. The numerals 9, 8 ... 2, 1, above the accumulator clutch teeth represent the points in the cycle when the accumulator magnets 199 are fully energized. Thus, if a "9" is to be added, a circuit to the magnet 199 is completed at the "9" time and wheel 187 is rotated through nine steps, at which time the clutch knockout roller 197 will cause disengagement of the clutch. If the magnet 199 had been energized at the "3" time, the clutch engagement would have taken place at the "3" time and have been disengaged by the roller 197 after three steps of movement. It is thus seen that the time of engagement is variable and the knockout or disengaging time occurs at a fixed point in the cycle. In the interval between the two camming rollers 197, carry operations take place under control of the contacts 214, 216, 219 to add a unit into appropriate order. The time of completion of this carry circuit is one point before the second camming roller 197 effects clutch disengagement.

Figure 13:
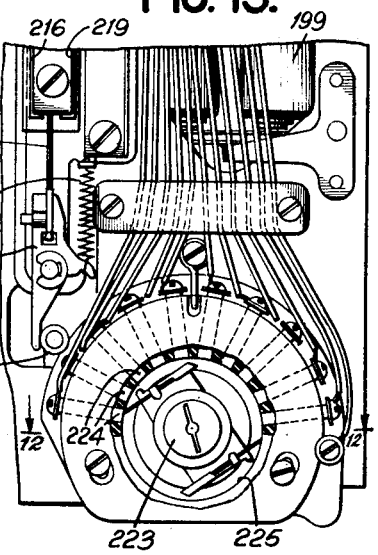

For enabling the reading out of the amount standing in an accumulator order, each wheel 187 has integral therewith a brush structure 223 (Figs. 12 and 13) comprising two brushes electrically connected to one another and insulated from the wheel. In the path of the brushes is fixed a commutator having ten segments 224 and a common segment 225. When a digit is entered in the accumulator, the brush structure takes a position wherein one brush contacts the segment 224 corresponding to the digit and the other brush contacts segment 225, thus forming an electrical connection between the two.

*Cam contacts and emitters*

Figure 6:
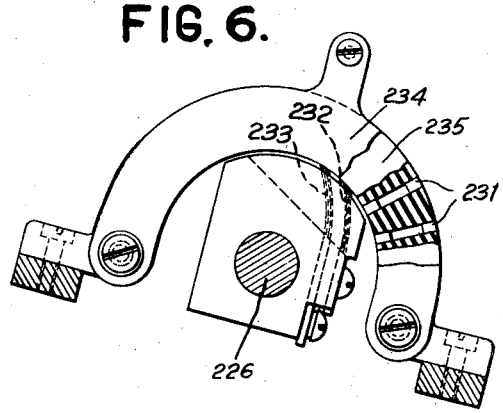
Fig. 6 is a detail of one of the emitters, the view being taken in the direction of lines 6—6 of Fig. 2.
Figure 7:
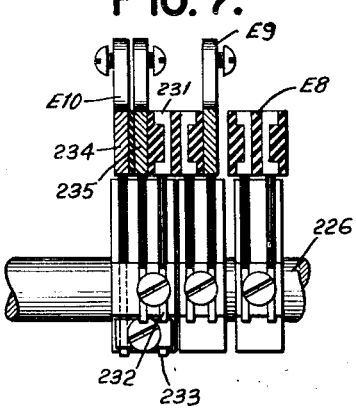
Fig. 7 is a sectional view of the emitter shown in Fig. 6.
Figure 18:
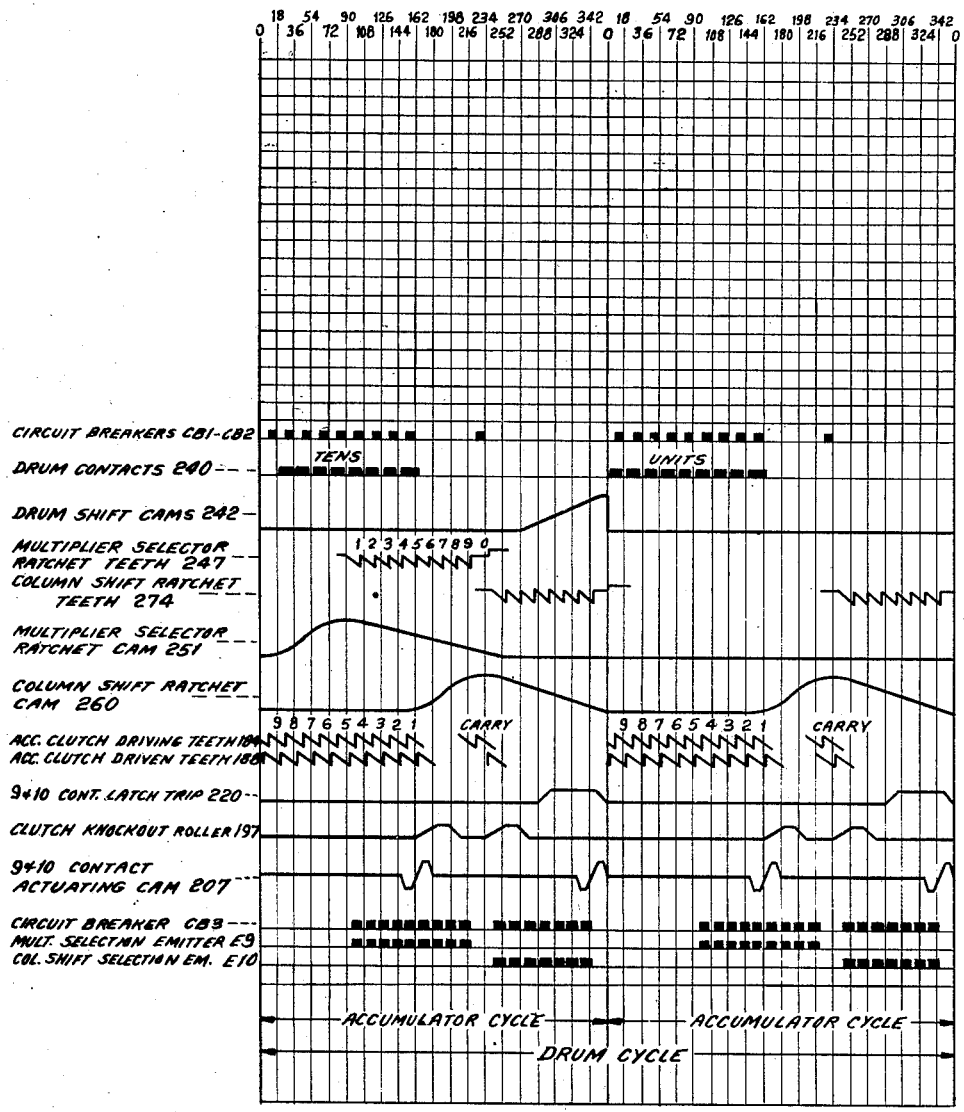
Fig. 18 is a chart showing the time of operation of various cam controlled mechanisms and the time of opening and closure of various contact devices.

The machine is provided with a number of cam contacts, circuit breakers and emitters controlling the completion of the circuit connections of the machine. These devices are shown in Fig. 2 where the shafts 226, 227 serve to support the same. Shaft 227 has a gear 228 at one extremity which through an idler 229 meshes with the gear 171 secured to shaft 166. Gear 228 also meshes with a gear 230 on the shaft 226 with the diameter of gear 230 one-half that of gear 228. At one end of shaft 226 are three circuit breaker contacts designated CB1, CB2 and CB3 which are controlled by scalloped periphery cams of insulating material. At the other end of the shaft 226 are conventional cam-controlled contacts designated CC1 to CC11. The timing of the various contacts is shown in Fig. 18. Near the center of shaft 226 are nine emitters designated E1 to E9. These emitters which are shown in section in Fig. 7 are of conventional construction comprising a ring of individual segments and a common ring which are bridged by brushes mounted on the shaft. These emitters are represented in the circuit diagram in the conventional manner. A special emitter E10 is provided (see Fig. 6) wherein the ring of individual segments 231 is traversed by two brushes 232 and 233 spaced one position apart. Each brush is electrically connected to a parallel companion brush, one of which traverses a common segment 234 and the other a common segment 235. With this arrangement the individual segments 231 are successively electrically connected to the common segment 235, and one step later the same segments are also connected to the common ring 234. On the lower shaft 227 are cam-controlled contacts (Fig. 2) designated DC1 to DC11 whose timing is also indicated on the timing chart (Fig. 18).

Through the gear connections traced, the shaft 226 will make one revolution for each cycle of operation of the accumulator mechanism, while shaft 227 makes one revolution for each two cycles of the accumulator mechanism, and the shafts operate only when the accumulating mechanisms are coupled for operation through the clutch mechanism 165, 168 by the magnet 170. The functions which are performed by the various circuit breakers, cam-controlled contacts and emitters will be more particularly pointed out in connection with the circuit diagram.

*The multiplying mechanism*

Figure 5:
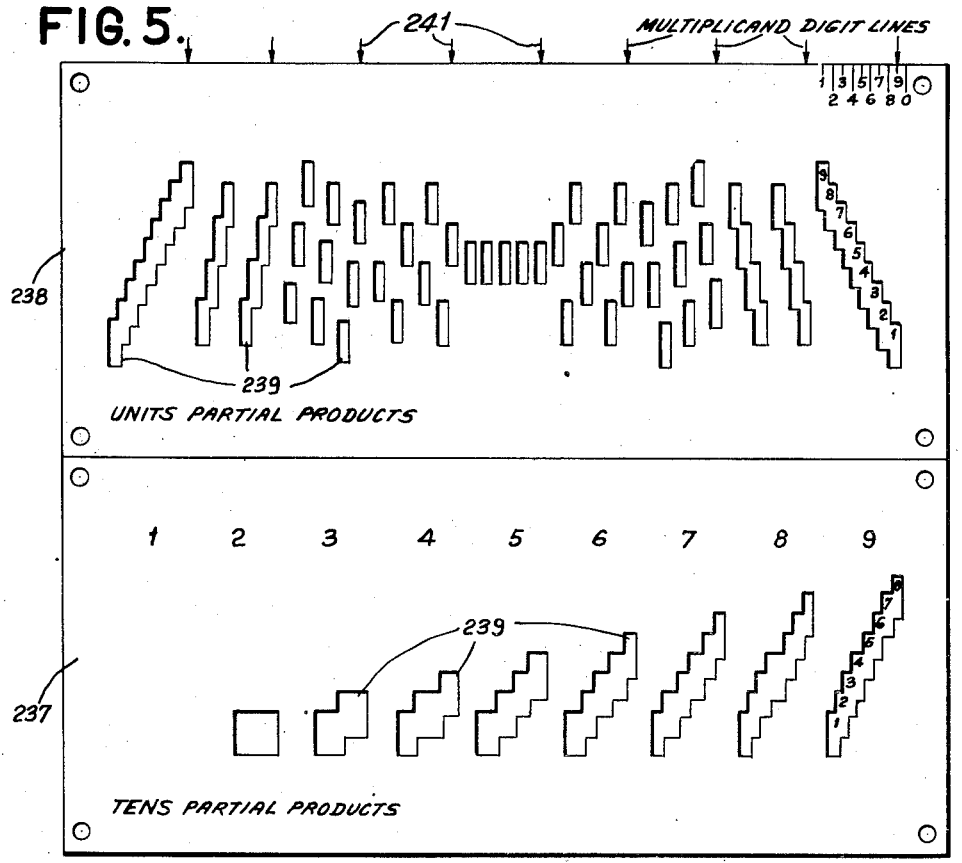
Fig. 5 is a development of the partial products drum.
Figure 10:
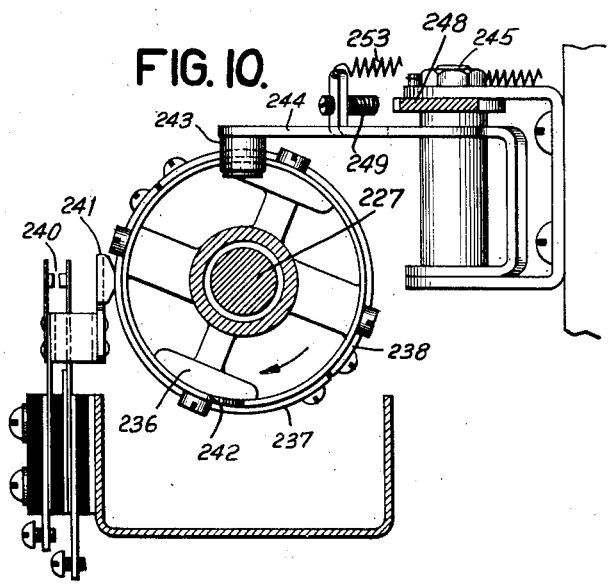
Fig. 10 is a detail taken along lines 10—10 of Fig. 3, showing the partial products drum in its relationship to the controlled contacts.

Slidably mounted on the shaft 227 (Figs. 2 and 3) is a multiplying drum or cylinder generally designated 236 which carries two semi-circular plates 237 and 238 in which are openings or perforations 239 arranged in accordance with the multiplication table. Along the side of the drum are located nine pairs of contacts 240 (see also Fig. 10). These pairs of contacts are provided with fingers 241 which traverse the surface of the plates 237 and 238 in line with the perforations 239 and, when they encounter a perforation, drop therein to effect closure of the related contacts 240. In Fig. 5 there is shown the development of the plates 237 and 238, the former of which is perforated in accordance with the tens digits and the latter in accordance with the units digits of the various products obtainable.

The drum may be shifted along its axis to any of ten positions in accordance with a selected multiplier digit. Thus, for example, in Fig. 5 the arrows representing the fingers 241 are shown in position to traverse the plates 237 and 238 in the "9" multiplier relationship. As the plates advance in the direction of the arrow at the right (Fig. 5), finger 241 farthest to the right will first drop into the "1" opening 239 in plate 238 and later will drop into the "8" opening of the plate 237. The time at which the fingers drop in the openings is coordinated with the timing of the accumulating mechanism, that is, the "1" opening of the plates is timed to enable closure of contacts 240 to complete a circuit for entering "1" into the accumulator, and the "8" opening is positioned to enable closure of the contacts 240 to enter an "8" into the accumulator. The circuits controlled by the contacts 240 will be specifically pointed out in the explanation of the circuit diagram.

Figure 8:
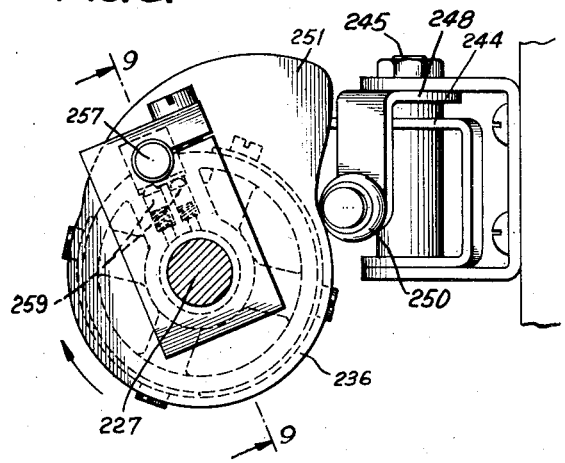
Fig. 8 is a view taken along lines 8—8 of Fig. 3.

*Drum positioning mechanism.*—The drum 236 is freely slidable on the shaft 227 and is provided with two camming projections 242 (Figs. 2 and 3) which cooperate with a roller 243 which is positioned in the path of rotation of the camming surfaces, which upon striking the roller will cause shifting of the drum in either direction according to a presetting of the roller. The roller is carried by an arm 244 pivoted at 245 and is integral with an arm 246 in whose end are notches 247. Lying adjacent arm 246 is a lever 248 which is also pivoted at 245 and which makes contact with the arm 246 through an adjustable screw 249. One end of arm 148 carries a roller 250 controlled by a cam 251 secured on the shaft 227 (see Fig. 8). Springs 252 and 253 tend to bias arms 248 and 246 in a clockwise direction while cam 251 controls their movement in a counterclockwise direction. As cam 251 revolves, the two arms move together in the relationship shown in Fig. 4 so that the notches 247 successively pass the toe of a spring-pressed armature pawl 254. During this movement, the magnet 255 may be selectively energized as will be explained in connection with the circuit diagram to rock pawl 254 into any of the notches 247. This will interrupt further movement of arm 246 while arm 248 continues its movement, wherein a pin 256 in its extremity moves up with the arm to broken line position shown in Fig. 4, wherein the pin 256 takes a position behind the actuated pawl 254 to lock the same in the selected notch. When the magnet 255 is not energized during the advance of arm 246, the pawl 254 will engage the lowermost notch representing 0 and pin 256 will strike the pawl 254 and move it into this notch, so that the parts occupy the position shown in Fig. 3.

Figure 9:
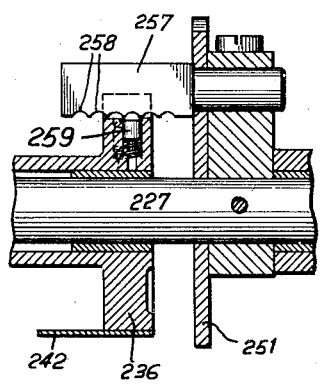
Fig. 9 is a detail taken along lines 9—9 of Fig. 8.

It will be apparent from the foregoing that the roller 243 on arm 244 is differentially positioned and locked in such position. This positioning takes place during the interval that the cams 242 are out of engagement with the roller, so that when the cams next contact the roller 243, the drum is moved directly in either direction to its next setting. Reference to the timing diagram (Fig. 18) will indicate the relative time in the cycle that the selector is positioned and the drum shifted. The timing chart also indicates the relative time that the contacts 240 are operated. Briefly, the sequence is as follows: The positioning of the drum is preselected by the stopping of the notches 247 following which the drum is actually shifted by the cams 242, and then the drum contacts 240 are operated in accordance with the units digits of the product during the right hand accumulating cycle. During the following accumulating cycle, the tens digits notches in the drum control the contacts 240. At this time the drum is free of the positioning roller 243, so that a new setting of the roller may be effected while the tens digit are read out according to the prior selection. To hold the drum in its various positions, there is provided a detenting arrangement shown in Fig. 9 which comprises a rod 257 secured in cam 251. This rod is provided with notches 258 which cooperate with a pair of spring-pressed plungers 259 (see Fig. 8) mounted in drum 236. The plungers alternately cooperate with the spaced notches 258 in the rod 257.

*Column shift unit*

In Figs. 14 and 15 is shown the column shift mechanism which is utilized for directing the circuits from the multiplying mechanism to the appropriate accumulators which are to receive the same. This mechanism serves to allocate the entries into the proper denominational positions. The mechanism is located to the left of the accumulators (see Fig. 2) and is operated under control of a cam 260 which is secured to the shaft 174. The cam 260 cooperates with a roller 261 which is mounted on the lower end of a plate 262 (Fig. 15) which is urged downwardly by a spring 263. On the plate 262 is secured a block 264 of insulating material in which are embedded a metallic conductor 265 and a group of six metallic conductors 266. Pressing against the block 264 are a number of spring-pressed contact plungers, one of which is shown in Fig. 17. These plungers are arranged as shown in Fig. 14 where they are grouped with twelve of them comprising a group designated 267, six comprising a group 268, the further group of six are designated 269 and a further single contact is designated 270. Each of the contacts is arranged in the form of a socket to receive the end of a plug wire 271 through which connection may be made to appropriate circuits. The contacts are mounted in a stationary block 272 so that they press against the block 264 and plate 262 urging the latter against guide rollers 273. As cam 260 revolves, the conductor 265 in block 264 is elevated so that it makes connection between contactor 270 and each of the contactors 269 in succession. At the same time the six connectors 268 are connected to the six lowermost sockets 267 and successively to the higher sockets.

As the plate 262 descends, it may be interrupted in any one of its several connecting positions. This is effected by means of a plurality of ratchet teeth 274 in an extension 275 of plate 262. These teeth are arranged to be engaged by a spring-pressed pawl 276 which, when a magnet 277 is energized, will intercept one of the teeth 274. The manner in which magnet 277 is energized and the controls for determining the order in which the teeth 274 are to be intercepted will be explained in connection with the circuit diagram. When the plate 262 is in its extreme uppermost position, a high portion of the extension 275 serves to engage and restore the pawl 276.

*Multiplying operations*

The machine is now about to enter upon multiplying operations during which the multiplier and multiplicand factors are multiplied and partial products, as they are derived, are directly entered into the product accumulator.

Assuming the driving motor to be in operation, and amounts set up on the multiplier and multiplicand devices of Figs. 1 and 1a, clutch magnet 170 (Fig. 19) may be energized by any suitable means and will thereupon effect coupling of the accumulator shafts 166 and 174 as well as the cam shafts 226 and 227 to the main drive, so that the several elements now operate with the timing indicated in Fig. 18.

*Circuit for shifting the multiplier.*—Referring now to Fig. 1, a circuit is now traceable from line 330, circuit breaker contacts CB3, emitter E9 to the readout device of the multiplier device, the circuit extending through the 4 contact 312 in the fourth position from the left, its common strip 314, thence through relay contacts R8c, magnet 255 to line 331. Thus, magnet 255 will be energized at a time in the cycle (see Figs. 3, 4) when the 4 tooth of arm 246 is opposite the toe of armature 254 controlled by the magnet 255 so that the arm 246 will be intercepted in the position shown in Fig. 4. The configuration of the tooth 247 will hold the armature in the position shown until locking pin 256 moves into its broken line position to positively lock the armature into the selected tooth position. In this manner the position of the multiplying drum is selected in accordance with the digital value of the lowest order of the multiplier.

Following the setting of arm 246 (Figs. 4, 3), the rotation of the multiplier drum will bring its cam 242 into engagement with the now positioned roller 243, so that the multiplying drum will adjust itself along shaft 227 in accordance with the selected digit 4. This positions the drum relatively to the fingers 241 of the multiplying contacts 240, so that they traverse the portions of the cam related to the multiplier digit 4.

*Column shift selection.*—While the multiplying drum is being positioned in accordance with the selected multiplier digit, the column shift plate 262 (Figs. 14, 15) is moved upward by its restoring cam 260 and then moves downwardly under spring control. During such downward movement, it is differentially positioned in accordance with the setting of the column skip relays R5 to R8 of Fig. 1. A circuit is now traceable from line 330, circuit breakers CB3, column shift magnet 277, cam contacts DC5, common ring 235 (see also Fig. 7), brush 232, first segment 231, upper contacts R8b to line 331. The timing of the emitter E10 is such that the magnet 277 is energized to engage the lowermost tooth 274 (Fig. 14) to position the column shift slide 262 to its highest active position. In such position the six conductors 266 in Fig. 14 are separately connected to the six highest contactors 267 to connect these contactors to the six contactors 268. In Fig. 1a are shown eight of the contactors 267 and four contactors 268, which are indicated as being relatively shiftable by plate 264 toward the left.

*Selecting and entering right hand partial products.*—The partial products drum now rotates to move the units plate 238 (Fig. 5) past the fingers 241 in unison with the movement of the accumulator mechanisms, so that the axial digital positions of the drum related to the digits pass the fingers 241 as the corresponding digital positions in the accumulators move through the corresponding positions for entering related digits. Thus, for the problem chosen with the lowest order of the multiplicand digit being 8 and the active multiplier digit 4, a circuit is traceable at the 2 time in the accumulating cycle from line 330 (Fig. 1a), circuit breakers CB1, CB2, the 8 contacts 240, the 8 contacts 312 in the fourth column from the left of the multiplicand device, the fourth conductor 314, column shift contactors 268, 267, right hand magnet 199P to line 331. The timing of the circuit to occur at the 2 time is controlled by the configuration of the unit partial products section of the multiplying drum in accordance with the multiplication table. During the same cycle parallel circuits are completed at different times in the cycle to enter into the other orders of the accumulator digital values representing the right hand orders of the partial product of the multiplicand amount times the multiplier digit 4.

The cycle during which the units partial products are entered into the accumulator is the one to the right in Fig. 18 from which it will be observed that, after the operation of the drum contacts 240 in this cycle, the column shift ratchet cam 260 operates to restore or elevate the column shift plate 262 (Figs. 14, 15) and permit this plate to descend during the latter part of this cycle. It is also to be observed that during the descent of the plate cam contacts DC4 close and their timing is such that they complete a circuit from line 330 (Fig. 1), circuit breaker CB3, column shift magnet 277, contacts DC4, collector ring 234 of emitter E10, brush 233, the first segment 231, the upper contacts R8b, to line 331. This is substantially the same circuit as previously traced through the magnet 277 with the exception that it now passes through the brush 233 instead of 232 and, due to their relative displacement, the circuit is completed at a slightly later time so that the column shift plate 262 of Fig. 14 will move down one step farther than previously before it is intercepted. The column shift mechanism when thus set up will properly adjust the connections for directing the tens partial product digits into the proper orders of the product accumulator during the next succeeding cycle, which is the one to the left in Fig. 18.

It is to be noted that during this cycle the multiplying drum remains in the position along the axis in which it was previously set and that during this cycle the second section containing the notches representing the multiplication table for the tens partial products controls the operation of the drum contacts 240. The circuits for controlling the entry of the tens partial products are completed in exactly the same manner as for the units partial products, so that they need not be specifically retraced, it being remembered, however, that the column shift connections will, through their preadjustment, direct the entries into the appropriate denominational orders of the accumulator.

*Selection of the second multiplier digit.*—The adjustment of the column shift plate 262 for adjusting the circuits during this present cycle has also adjusted the conductor 265 (Figs. 14 and 1) from the dotted to the full line position in the latter figure, wherein it will permit the completion of a circuit during the early part of the cycle upon closure of cam contacts DC6 which is traceable from line 330 (Fig. 1), contacts DC6, contactor 270, conductor 265, contactor 269 farthest to the right, relay magnet R8 to line 331. The magnet R8 will close its contacts R8a to provide a holding circuit for itself. In the meantime, drum selector ratchet plate 246 of Fig. 3 has been restored without disturbing the position of the multiplier drum, which drum is held in position by the detenting mechanism described.

As the plate 246 now rocks through its selecting stroke in synchronism with the operation of emitter E9, a circuit is completed to select the next multiplier digit which is 3 for the example chosen. Thus, when the 3 tooth 247 is in selecting position, the magnet 255 is energized through a circuit from line 330 (Fig. 1), contacts CB3, emitter E9, through its 3 segment, corresponding wire, to the 3 contact 312, the third column from the left of the readout device of the multiplier device, thence through the common conductor 314, right hand contacts R7c, left hand contacts R8c, magnet 255 to line 331.

As a result, the control setting for the next position of the multiplying drum is determined so that, near the end of the cycle, the multiplying drum will adjust itself in accordance with the next multiplier digit. Also, during the latter part of the cycle the column shift mechanism will readjust itself in accordance with the entry condition for the units partial products obtained by multiplying by the second order digit of the multiplier.

It is to be noted that the column shift condition for the next following cycle must be the same as for the one just completed, so that the column shift magnet 277 must be energized at the same point of time. The circuit for effecting this is traceable in Fig. 1 from line 330, contacts CB3, cam contacts DC5, collector ring 235 and this time through the advance brush 232, the second segment 231, upper contacts R7b, lower contacts R8b, to line 331. It is to be noted that energization of magnet 277 in the previous cycle occurred with brush 233 on the first segment. The present circuit is also completed when the brush 233 is on the first segment, although the actual completion is through the brush 232. It is thus apparent that the timing of the completion of the two circuits is at the same point of time in the respective cycles.

Multiplying operations proceed, taking two cycles as indicated in Fig. 18 for each multiplier digit, so that after a multiplication has been effected by the last multiplier digit, the complete product is standing in the product accumulator. All the relay magnets R5 to R8 (Fig. 1) are energized at this time so that, at the time indicated in Fig. 18 when cam contacts DC8 close, a circuit is traceable from line 330 (Fig. 1), contacts DC8, relay magnet R49, lower contacts R5b to R8b in series, to line 331. The relay magnet R49 terminates multiplying operations by effecting deenergization of clutch magnet 170 (Fig. 19) in a manner not shown, and as a result the parts come to rest with the product set in the accumulator.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable multiplying machine, having a drum containing configurations representing partial product values for all possible multiplier and multiplicand digit factors, said drum being positionable along its axis to any one of a number of digit representing positions, means for rotating the drum, a set of digit representing contacts cooperable with the configurations of the drum during its rotation for completing partial product entering circuits, a device settable to represent a multiplier digit, and means controlled by said settable device for positively moving said drum axially in either direction directly from any of its positions to any other position to bring certain of the configurations in cooperative relationship with the set of contacts, said set of contacts being arranged in a line coaxial with the drum.

2. The invention set forth in claim 1 in which the drum has integral therewith cam mechanism, arranged and constructed to cooperate with the means controlled by the settable means to cause movement of the drum in either direction from one position on its axis directly to the next position.

3. The invention set forth in claim 1 in which the moving means comprises a cam guide differentially positionable along a line parallel to the axis of the drum, and a pair of opposite cam surfaces integral with the drum and engageable with the guide during a period in the rotation of the drum to cam the drum axially to a position predetermined by the initial location of the guide.

4. The invention set forth in claim 1 in which the moving means comprises a cam guide, means for differentially positioning the same along a line parallel to the axis of the drum during the rotation of the drum and while the contacts are in cooperative relation with the configurations, and a pair of opposite cam surfaces integral with the drum and engageable with the guide when the contacts are out of cooperative relation with the configurations to cam the drum axially to a new position.

5. In a cyclically operable multiplying machine, an accumulator, a member containing configurations representing partial product values for all possible multiplier and multiplicand digit factors, said member being continuously movable in one direction and positionable in a transverse direction to any one of a number of digit representing positions, a set of digit representing elements arranged in a line, means for moving the member in a direction transverse to said line of elements, whereby said elements are cooperable with the configurations of the member for effecting partial product entries into said accumulator, a device settable to represent a multiplier digit, means controlled by said settable device for positively moving said member in a direction parallel to said line of elements in either direction from any of its positions to any other position to select a certain part of the configurations for control of said elements during the movement of the member in the transverse direction, and means for maintaining the member in the position to which it is positively moved.

6. In a cyclically operable multiplying machine, having a drum containing configurations representing partial product values for all possible multiplier and multiplicand digit factors, means for rotating the drum, a set of digit representing contacts cooperable with the configurations of the drum during its rotation for completing partial product entering circuits, a multiplier receiving device having denominationally ordered elements, means for reading a different element during each cycle of the machine, a device movable each cycle through a succession of positions representative of the digits, means controlled by one of said elements in each cycle for interrupting said device at the digital position representing the setting of the element read during the related cycle, and means controlled by said settable means for positively moving said drum axially to bring certain of the configurations in cooperative relationship with the set of contacts, said set of contacts being arranged in a line coaxial with the axis of rotation of the drum.

SAMUEL BRAND.
JAMES M. CUNNINGHAM.

---

Certificate of Correction

Patent No. 2,375,235.    May 8, 1945.

CARL A. MAXWELL

It is hereby certified that errors appear in the printed specification of the above numbered patent requiring correction as follows: Page 3, second column, line 27, after "tapered" insert *section*; page 4, first column, line 73, after "also" insert *so*; page 5, second column, line 7, claim 2, for "expanded" read *expanding*; and line 55, claim 4, for "these" read *thus*; page 6, first column, line 61, claim 7, after "it" insert *is*; and line 69, same claim, strike out the article "a"; and second column, line 21, claim 8, strike out "at the cage"; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*